US012067911B2

(12) United States Patent
Choi et al.

(10) Patent No.: US 12,067,911 B2
(45) Date of Patent: Aug. 20, 2024

(54) DISPLAY DRIVING DEVICE AND DISPLAY DRIVING METHOD

(71) Applicant: LX SEMICON CO., LTD., Daejeon (KR)

(72) Inventors: Jung Min Choi, Daejeon (KR); Jong Min Park, Daejeon (KR); Chung Min Lee, Daejeon (KR); Kwon Sang Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 125 days.

(21) Appl. No.: 17/854,152

(22) Filed: Jun. 30, 2022

(65) Prior Publication Data

US 2023/0011297 A1 Jan. 12, 2023

(30) Foreign Application Priority Data

Jul. 7, 2021 (KR) ........................ 10-2021-0089086

(51) Int. Cl.
*G09G 3/00* (2006.01)

(52) U.S. Cl.
CPC ..... *G09G 3/006* (2013.01); *G09G 2310/0275* (2013.01)

(58) Field of Classification Search
CPC .. G09G 3/006; G09G 2310/0275; G09G 3/36; G09G 2310/0297; G09G 2330/12; G09G 3/3266; G09G 3/3275; G09G 3/3674; G09G 3/3685
See application file for complete search history.

(56) References Cited

U.S. PATENT DOCUMENTS

2006/0139543 A1* 6/2006 Kim ..................... G09G 3/3648 382/126
2007/0109482 A1* 5/2007 Kim ...................... G02F 1/1393 349/144
2007/0118781 A1* 5/2007 Kim ..................... G09G 3/3291 714/727
2021/0373733 A1* 12/2021 Kitagawa ............ G06F 3/04164

FOREIGN PATENT DOCUMENTS

KR 20150116069 A * 10/2015
KR 20170064177 A * 6/2017

* cited by examiner

*Primary Examiner* — Thang X Le
*Assistant Examiner* — Haidong Zhang
(74) *Attorney, Agent, or Firm* — ROTHWELL, FIGG, ERNST & MANBECK, P.C.

(57) ABSTRACT

A display driving device for driving a display panel, including a gate line, a data line intersecting with the gate line, and a pixel defined by the gate line and the data line, includes a data driver inputting an image signal to the pixel through the data line, a panel test unit determining the occurrence or not of an error of the gate line or the data line, and a switching unit selectively connecting the data driver or the panel test unit to the display panel.

15 Claims, 11 Drawing Sheets

DISPLAY DRIVING DEVICE AND DISPLAY DRIVING METHOD

CROSS-REFERENCE TO RELATED APPLICATIONS

This application claims the benefit of the Korean Patent Application No. 10-2021-0089086 filed on Jul. 7, 2021, which is hereby incorporated by reference as if fully set forth herein.

FIELD

The present disclosure relates to a display driving device and a display driving method.

BACKGROUND

Display apparatuses, which display an image, include liquid crystal display (LCD) apparatuses using liquid crystal, organic light emitting diode (OLED) display apparatuses including an OLED, etc.

Recently, as semiconductor manufacturing technology and image processing technology advance, it is easy to lighten and slim display apparatuses, and the practical use and supply of display apparatuses for realizing high image quality are rapidly increasing.

A display panel of such display apparatuses is developed to have a large screen, lightness, and a thin thickness, and thus, durability against a crack or a scratch and a broken phenomenon caused by an external impact is largely needed.

For example, when a crack occurs in a display panel, short circuit or an open phenomenon may occur in a power applied to the display panel, and due to this, a problem where an overcurrent flows in the display panel may occur. Due to such a problem, the image quality of the display panel may be changed, and moreover, fire caused by overheating may occur or a user may burn. Therefore, it is required to detect an error of the display panel.

SUMMARY

Accordingly, the present disclosure is directed to providing a display driving device and a display driving method that substantially obviate one or more problems due to limitations and disadvantages of the related art.

An aspect of the present disclosure is directed to providing a display driving device and a display driving method, which detect an error of a display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display driving device for driving a display panel including a gate line, a data line intersecting with the gate line, and a pixel defined by the gate line and the data line, the display driving device including a data driver inputting an image signal to the pixel through the data line, a panel test unit determining the occurrence or not of an error of the gate line or the data line, and a switching unit selectively connecting the data driver or the panel test unit to the display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
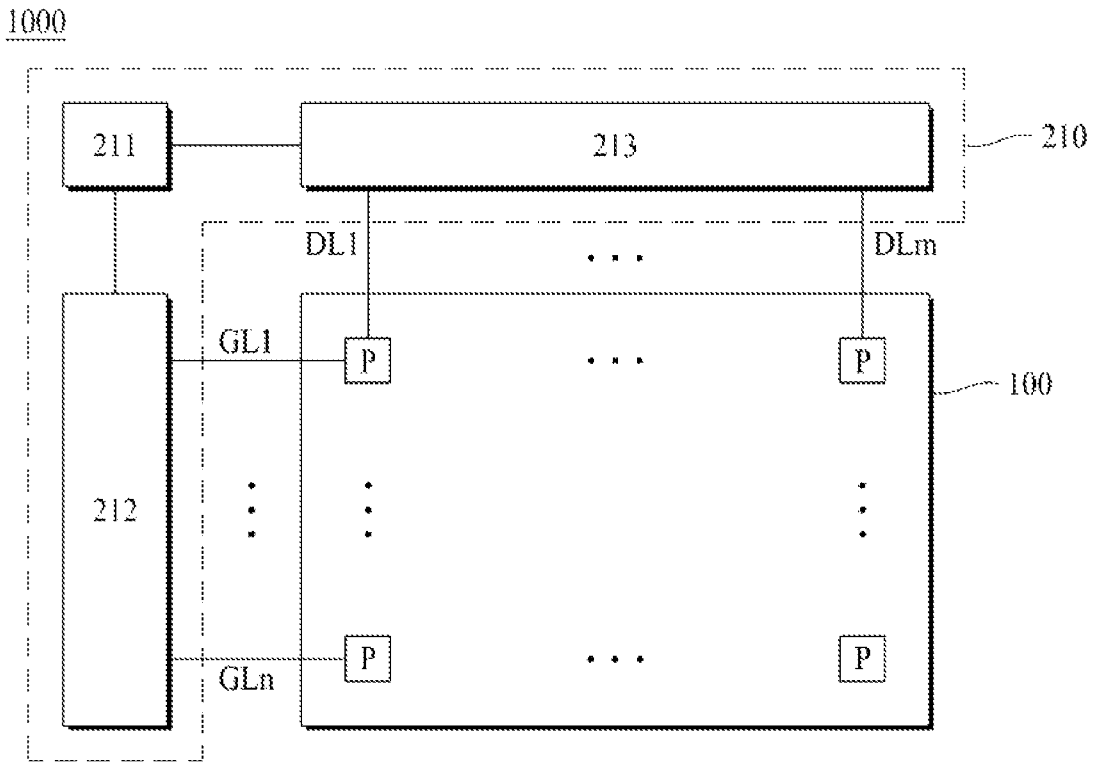
FIG. 1 is a block diagram of a display apparatus according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where ‘comprise’, ‘have’, and ‘include’ described in the present specification are used, another part may be added unless ‘only’ is used. The terms of a singular form may include plural forms unless referred to the contrary.

In construing an element, the element is construed as including an error range although there is no explicit description.

In describing a time relationship, for example, when the temporal order is described as ‘after~’, ‘subsequent~’, ‘next~’, and ‘before~’, a case which is not continuous may be included unless ‘just’ or ‘direct’ is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus and a display driver according to the present disclosure will be described in detail with reference to FIGS. 1 to 4.

Figure 2:
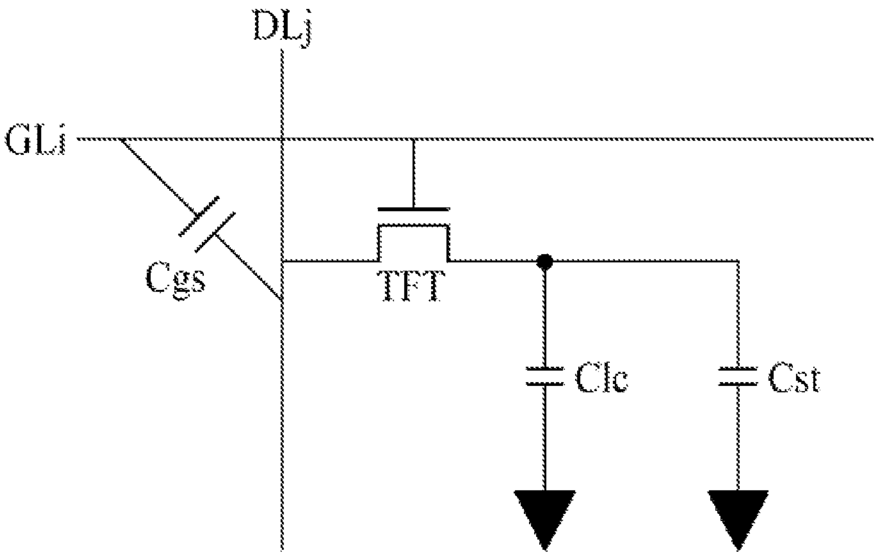
FIG. 2 is a diagram illustrating an equivalent circuit of a pixel of FIG. 1.
Figure 3:
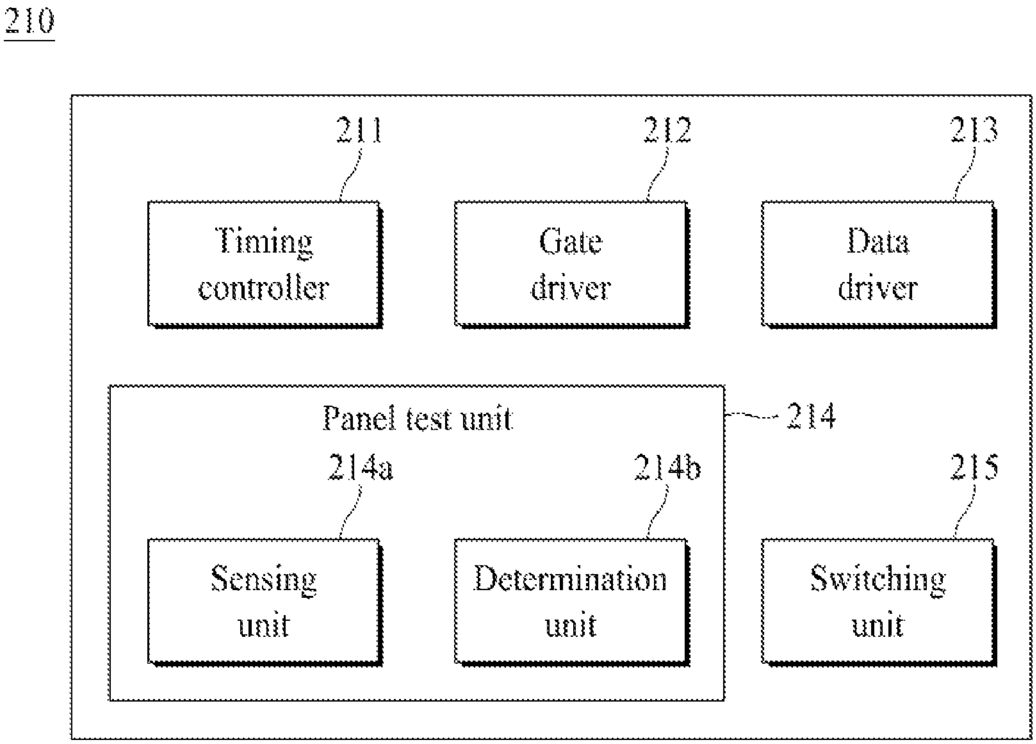
FIG. 3 is a block diagram of a display driving device according to an embodiment of the present disclosure.
Figure 4:
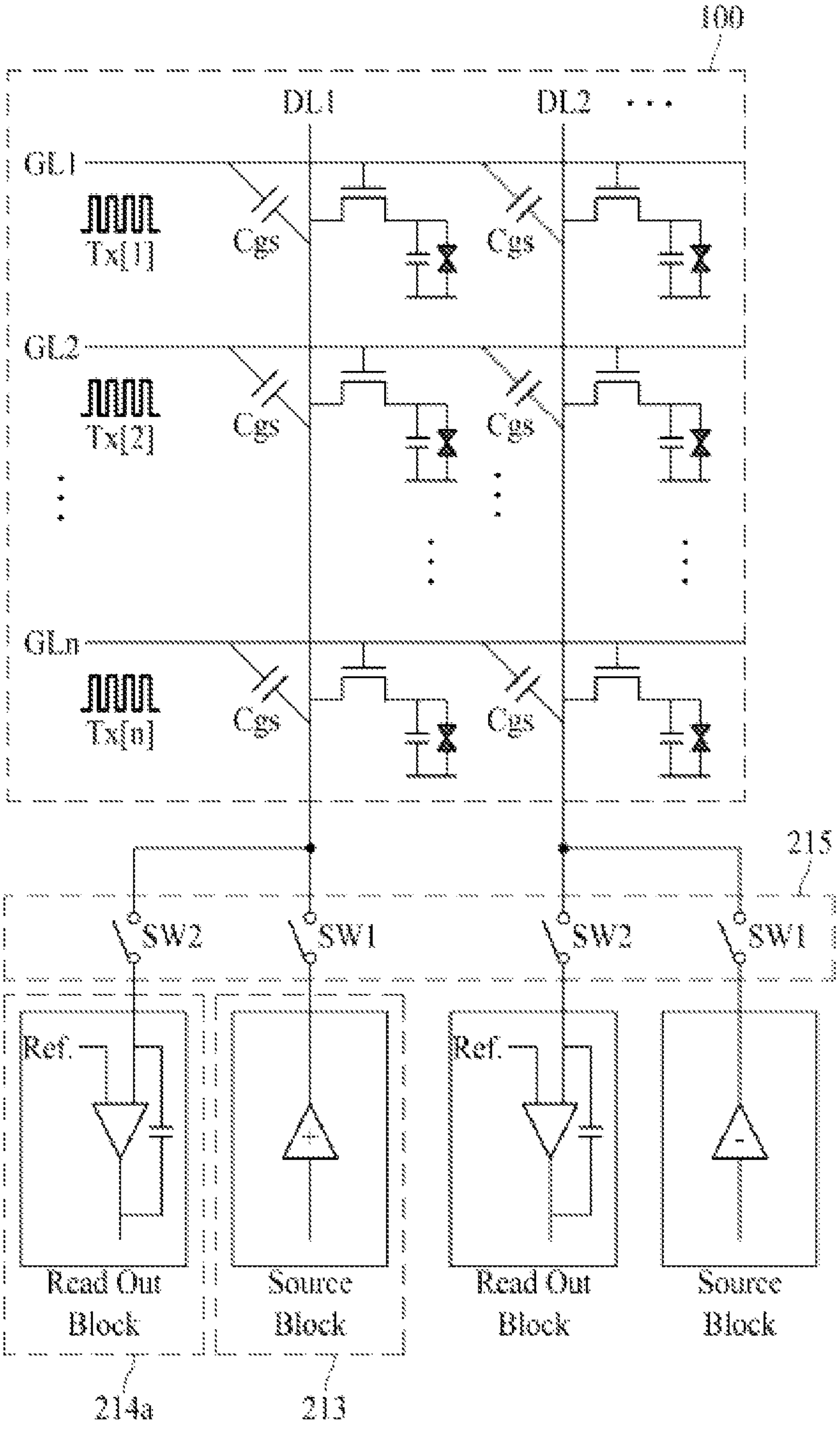
FIG. 4 is a diagram illustrating a connection relationship between a display panel, a data driver, a panel test unit, and a switching unit according to an embodiment of the present disclosure.

FIG. 1 is a block diagram of a display apparatus 1000 according to an embodiment of the present disclosure, FIG. 2 is a diagram illustrating an equivalent circuit of a pixel of FIG. 1, FIG. 3 is a block diagram of a display driving device according to an embodiment of the present disclosure, and FIG. 4 is a diagram illustrating a connection relationship between a display panel, a data driver, a panel test unit, and a switching unit according to an embodiment of the present disclosure.

Referring to FIG. 1, the display apparatus 1000 according to an embodiment of the present disclosure may include a display panel 100 and a display driving device 210. Although not shown, the display apparatus 1000 according to an embodiment of the present disclosure may further include a touch driving device.

The display apparatus 1000 may perform a display function and may be implemented as a flat display apparatus such as an LCD apparatus or an OLED display apparatus.

According to an embodiment of the present disclosure, the display apparatus 1000 may operate in a display mode or a panel test mode. When the display apparatus 1000 operates in the display mode, the display panel 100 may display an image having a certain gray level, and when the display apparatus 1000 operates in the panel test mode, the display driving device 210 may test the occurrence or not of an error of the display panel 100. An operation based on a mode will be described below in detail with reference to FIGS. 5 to 11.

The display panel 100 may include a plurality of gate lines GL1 to GLn, a plurality of data lines DL1 to DLm, and a plurality of pixels P.

Each of the plurality of gate lines GL1 to GLn may receive a gate pulse (or a scan pulse) Tx[1] to Tx[n]. Each of the plurality of data lines DL1 to DLm may receive a data signal. The plurality of gate lines GL1 to GLn and the plurality of data lines DL1 to DLm may be disposed on a substrate to intersect with one another, and thus, may define the plurality of pixels P. Each of the plurality of pixels P, as illustrated in FIG. 2, may include a thin film transistor TFT connected to a gate line GLi and a data line DLj adjacent thereto, a pixel electrode (not shown) connected to the thin film transistor TFT, a storage capacitor Cst connected to the pixel electrode, and a parasitic capacitor Cgs formed between the gate line GLi and the data line DLj.

According to an embodiment of the present disclosure, the display driving device 210 may allow a data signal to be supplied to the plurality of pixels P included in the display panel 100 in the display mode, and thus, the display panel 100 may display an image. In the panel test mode, the occurrence or not of an error of the display panel 100 may be tested by using the parasitic capacitor Cgs formed in the display panel 100.

Referring to FIG. 3, the display driving device 210 may include a timing controller 211, a gate driver 212, a data driver 213, a panel test unit 214, and a switching unit 215.

The timing controller 211 may receive various timing signals including a vertical synchronization signal, a horizontal synchronization signal, a data enable signal, and a clock signal from an external system (not shown) to generate a gate control signal GCS for controlling the gate driver 212 and a data control signal for controlling the data driver 213. Also, the timing controller 211 may receive a video signal from the external system, convert the received video signal into an image signal having a format capable of being processed by the data driver 213, and output the image signal.

The timing controller 211 may compress an external data enable signal transmitted from a host system on the basis of a predetermined time to generate an internal data enable signal.

The host system may convert digital video data into a format suitable for displaying corresponding video data on the display panel 100. The host system may transmit the digital video data and the timing signals to the timing controller 211. The host system may be implemented as one of a television (TV) system, a set top box, a navigation system, a DVD player, a blue player, a personal computer (PC), a home theater system, and a phone system and may receive an input video.

The gate driver 212 may receive the gate control signal GCS from the timing controller 211. The gate control signal GCS may include a gate start pulse, a gate shift clock, and a gate output enable signal. The gate driver 212 may generate the gate pulses Tx[1] to Tx[n] synchronized with the data signal on the basis of the received gate control signal GCS and may shift the generated gate pulse to sequentially supply the shifted gate pulse to the gate lines GL1 to GLn. To this end, the gate driver 212 may include a plurality of gate drive integrated circuits (ICs) (not shown). The gate drive ICs may sequentially supply the gate pulses Tx[1] to Tx[n] synchronized with the data signal on the basis of control by the timing controller 211 to select a data line to which the data signal is applied. The gate pulses Tx[1] to Tx[n] may swing between a gate high voltage and a gate low voltage.

The data driver 213 may receive the data control signal and the image signal from the timing controller 211. The data control signal may include a source start pulse, a source sampling clock, and a source output enable signal. The source start pulse may control a data sampling start timing of n (where n is an integer of 2 or more) number of source drive ICs (not shown) configuring the data driver 213. The source sampling clock may be a clock signal for controlling a sampling timing of data in each of the source drive ICs. The source output enable signal may control an output timing of each source drive IC.

As illustrated in FIG. 4, the data driver 213 may be connected to each of the plurality of data lines DL1 to DLm, convert the received image signal into an analog data signal, and may supply the data signal to pixels P through the plurality of data lines DL1 to DLm.

The panel test unit 214 may test the occurrence or not of an error of the display panel 100 by using the parasitic capacitor Cgs formed in each pixel P of the display panel 100 in the panel test mode. In detail, the panel test unit 214 may determine the occurrence or not of an error of the gate lines GL1 to GLn or the data lines DL1 to DLm of the display panel 100 to detect a gate line or a data line where an open phenomenon or short circuit occurs. To this end, as illustrated in FIG. 3, the panel test unit 214 may include a sensing unit 214*a* and a determination unit 214*b*.

The sensing unit 214*a*, as illustrated in FIG. 4, may be connected to each of the plurality of data lines DL1 to DLm through the below-described switching unit 215 and may sense a parasitic capacitance signal caused by the parasitic capacitor Cgs formed between each gate line and each data line in the panel test mode. To this end, the sensing unit 214*a* may include a plurality of readout circuits which are respectively connected to the plurality of data lines DL1 to DLm.

In the panel test mode, the determination unit 214*b* may determine whether each gate line or each data line is opened or short-circuited, on the basis of a predetermined first threshold value and a predetermined second threshold value. For example, when a parasitic capacitance signal of one data line is less than the first threshold value, the determination unit 214*b* may determine that a corresponding data line is opened, and when a parasitic capacitance signal of one data line is greater than the second threshold value, the determination unit 214*b* may determine that a corresponding data line or a corresponding gate line is short-circuited. In this case, the first threshold value may be less than the second threshold value.

The switching unit 215, as illustrated in FIG. 4, may selectively connect the data lines DL1 to DLm of the display panel 100 to the data driver 213 or the panel test unit 214 on the basis of a mode. In detail, the switching unit 215 may include a plurality of first switches SW1, which respectively connect the data lines DL1 to DLm to the data driver 213, and a plurality of second switches SW2 which respectively connect the data lines DL1 to DLm to the panel test unit 214.

According to embodiments of the present disclosure, in the display mode, the plurality of first switches SW1 may be turned on and may respectively connect the data lines DL1 to DLm to the data driver 213, and the plurality of second switches SW2 may be turned off. In the panel test mode, the plurality of first switches SW1 may be turned off, and the plurality of second switches SW2 may be turned on and may respectively connect the data lines DL1 to DLm to the panel test unit 214.

According to an embodiment of the present disclosure, the data lines DL1 to DLm of the display panel 100 may be selectively connected to the data driver 213 or the panel test unit 214 on the basis of a mode, and in the panel test mode, a gate line or a data line where an error occurs may be detected by testing the occurrence or not of an error of the display panel 100 and relevant information may be provided to a user of the display apparatus 1000.

Hereinafter, a driving method of a display apparatus according to an embodiment of the present disclosure will be described in detail with reference to FIGS. 5 to 7.

Figure 5:
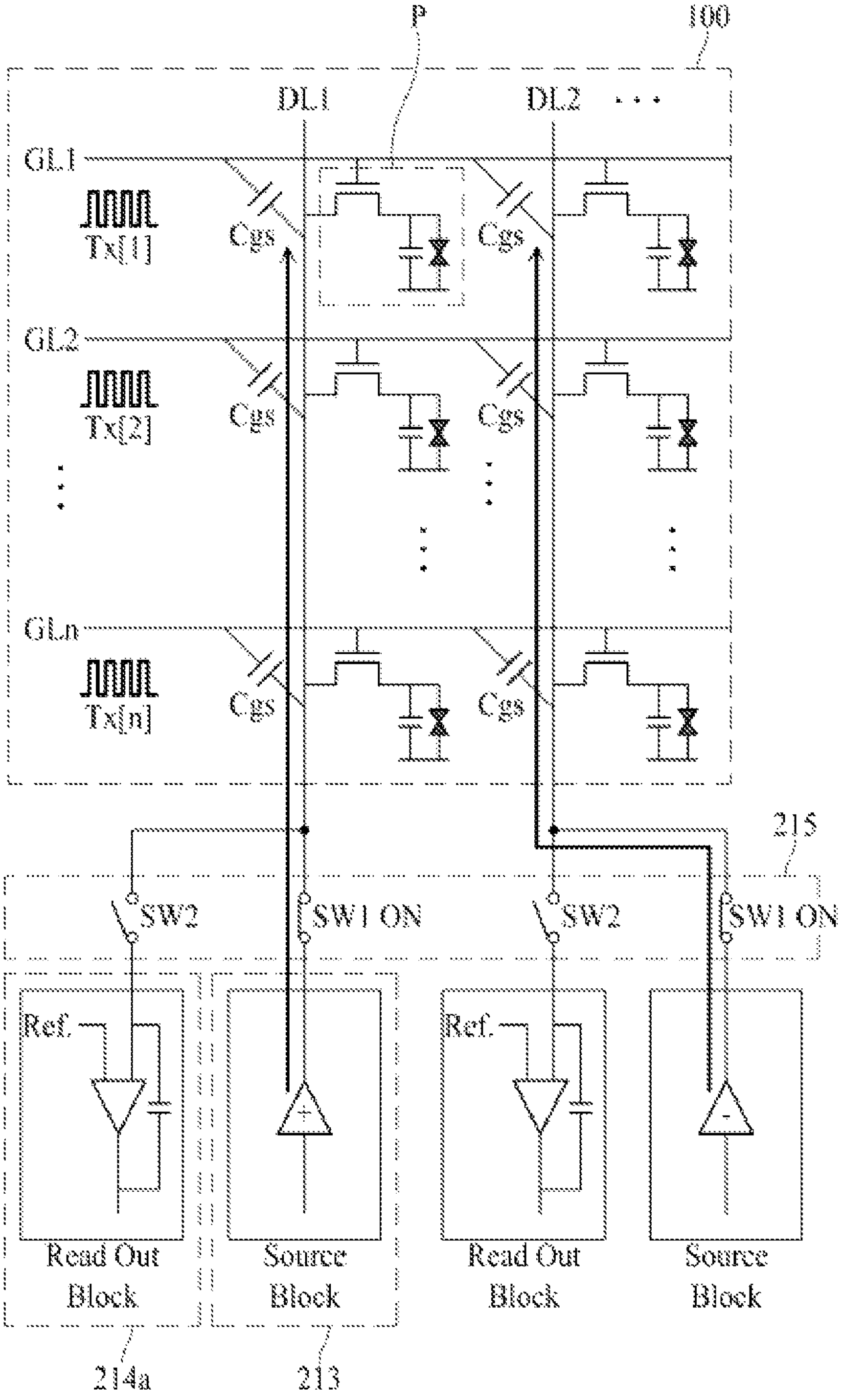
FIG. 5 is a diagram illustrating a display driving method in a display mode according to an embodiment of the present disclosure.
Figure 6:
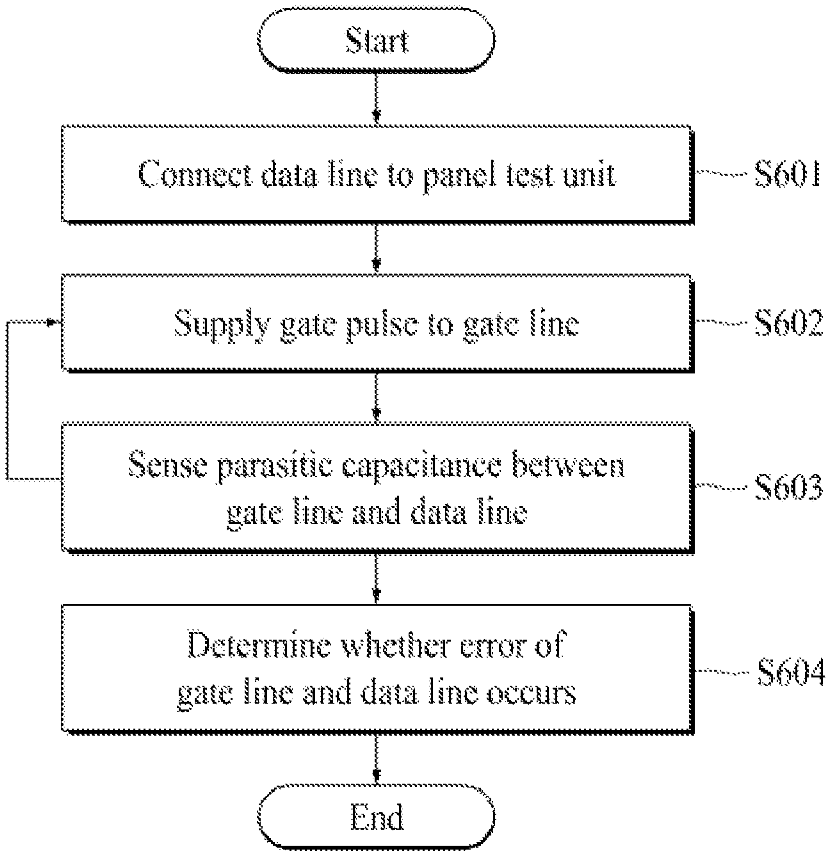
FIG. 6 is a flowchart of a panel test method in a panel test mode according to an embodiment of the present disclosure.
Figure 7:
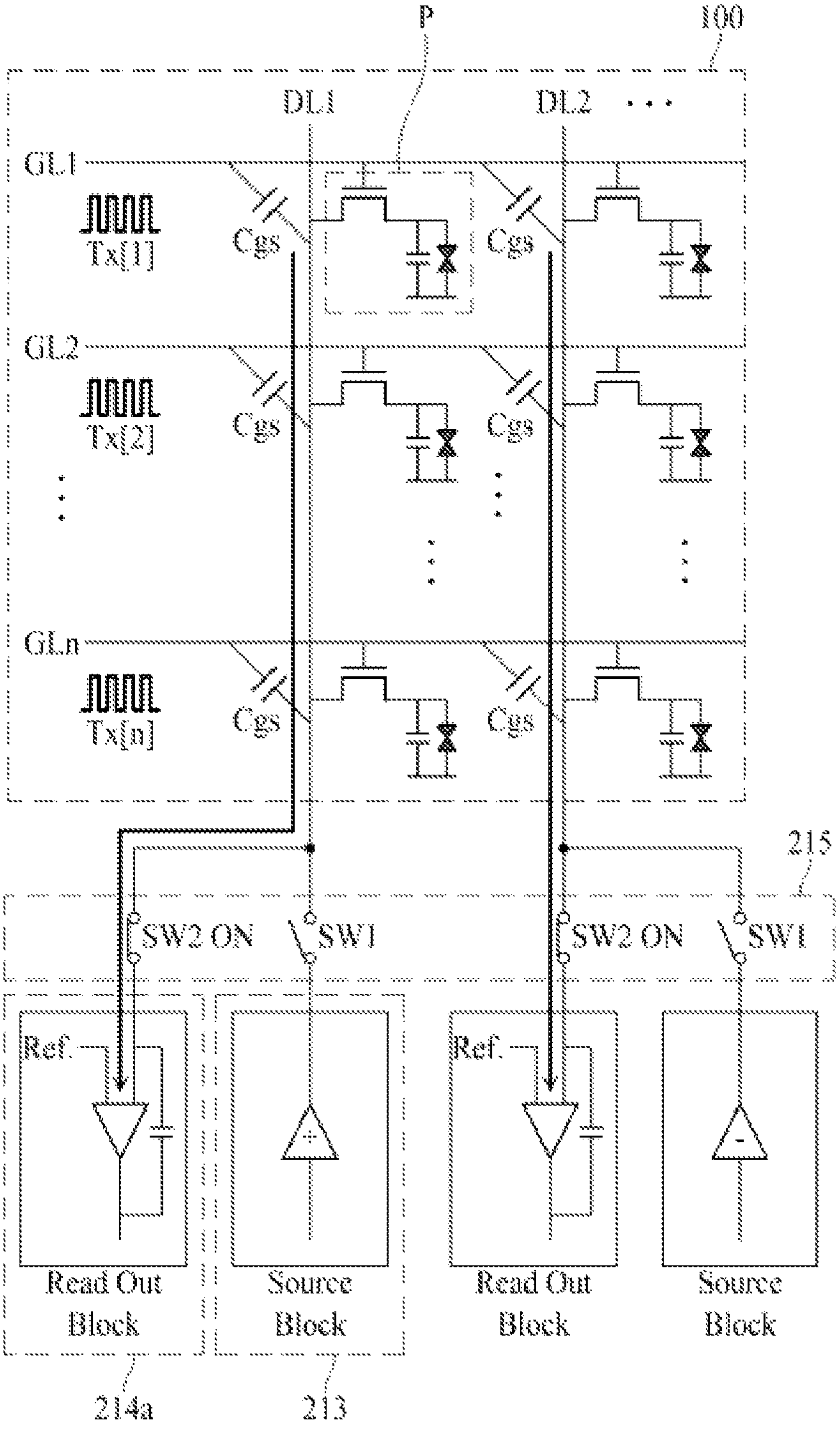
FIG. 7 is a diagram illustrating a display driving method in a panel test mode according to an embodiment of the present disclosure.

FIG. 5 is a diagram illustrating a display driving method in a display mode according to an embodiment of the present disclosure, and FIG. 6 is a flowchart of a panel test method in a panel test mode according to an embodiment of the present disclosure. FIG. 7 is a diagram illustrating a display driving method in a panel test mode according to an embodiment of the present disclosure.

Referring to FIG. 5, in the display mode, the switching unit 215 may connect the plurality of data lines DL1 to DLm of the display panel 100 to the data driver 213. In detail, in the display mode, the plurality of first switches SW1 of the switching unit 215 may be turned on and may connect the plurality of data lines DL1 to DLm to the data driver 213. Therefore, the data driver 213 may supply a data signal, obtained through analog conversion of an image signal, to pixels P connected to the plurality of data lines DL1 to DLm through the plurality of data lines DL1 to DLm. That is, based on control by the timing controller 211, the gate pulses Tx[1] to Tx[n] synchronized with the data signal may be sequentially supplied to the gate lines GL1 to GLn, and the data signal may be sequentially supplied to the data lines DL1 to DLm, whereby the display panel 100 may display an image.

Referring to FIG. 6, in the panel test mode, each of the data lines DL1 to DLm may be connected to the panel test unit 214 (S601). In detail, as illustrated in FIG. 7, in the panel test mode, the second switch SW2 of the switching unit 215 may be turned on and may connect each of the data lines DL1 to DLm to the sensing unit 214*a* of the panel test unit 214.

Subsequently, the gate pulses Tx[1] to Tx[n] may be supplied to a gate line (S602). In detail, the gate pulses Tx[1] to Tx[n] may be sequentially supplied to the plurality of gate lines GL1 to GLn, and each of the gate pulses Tx[1] to Tx[n] may be supplied to a corresponding gate line on the basis of the plurality of data lines DL1 to DLm. Therefore, a parasitic capacitance Cgs may be generated between each gate line and each data line.

Subsequently, the panel test unit 214 may sense a parasitic capacitance signal based on the parasitic capacitance Cgs generated between each gate line and each data line (S603). In detail, the parasitic capacitance signal based on the parasitic capacitance Cgs generated between each gate line and each data line may be input to the readout circuit of the sensing unit 214*a* corresponding to each data line through the second switches SW2 of the switching unit 215. At this time, an input signal may be stored in the panel test unit 214.

In this case, steps (S602) and (S603) may be repeatedly performed until all gate lines are driven. However, the present disclosure is not limited thereto, and steps (S602) to (S604) may be repeatedly performed until all gate lines are driven.

Subsequently, the panel test unit 214 may determine the occurrence or not of an error of each gate line or each data line (S604). In detail, the determination unit 214*b* of the panel test unit 214 may compare a signal of the sensed parasitic capacitance Cgs with the predetermined first threshold value or the predetermined second threshold value to determine the occurrence or not of an error of each gate line or each data line. For example, when a signal corresponding to one data line is less than the first threshold value, the determination unit 214*b* may determine that a corresponding data line is opened, and when a signal corresponding to one data line is greater than the second threshold value, the determination unit 214*b* may determine that a corresponding data line or a corresponding gate line is short-circuited. In this case, the first threshold value may be less than the second threshold value. In this case, the occurrence or not of an error of each gate line and each data line may be determined whenever each gate line is driven, a signal based on the parasitic capacitance Cgs corresponding to each gate line and each data line may be stored, and after driving of all gate lines is completed, the occurrence or not of an error of each gate line and each data line may be determined. Also, the occurrence or not of an error of the gate lines GL1 to GLn and the data lines DL1 to DLm may be finally determined based on that the occurrence or not of an error is determined in driving each gate line. However, a sequence and a method of determining the occurrence or not of an error of each gate line and each data line are not limited thereto, and various methods and sequences may be executed.

According to an embodiment of the present disclosure, the data lines DL1 to DLm of the display panel 100 may be selectively connected to the data driver 213 or the panel test unit 214 on the basis of a mode, and in the panel test mode, a gate line or a data line where an error occurs may be detected by testing the occurrence or not of an error of the display panel 100 and relevant information may be provided to a user of the display apparatus 1000.

Hereinafter, a connection relationship between a display driver and a display panel according to another embodiment of the present disclosure will be described in detail with reference to FIG. 8.

Figure 8:
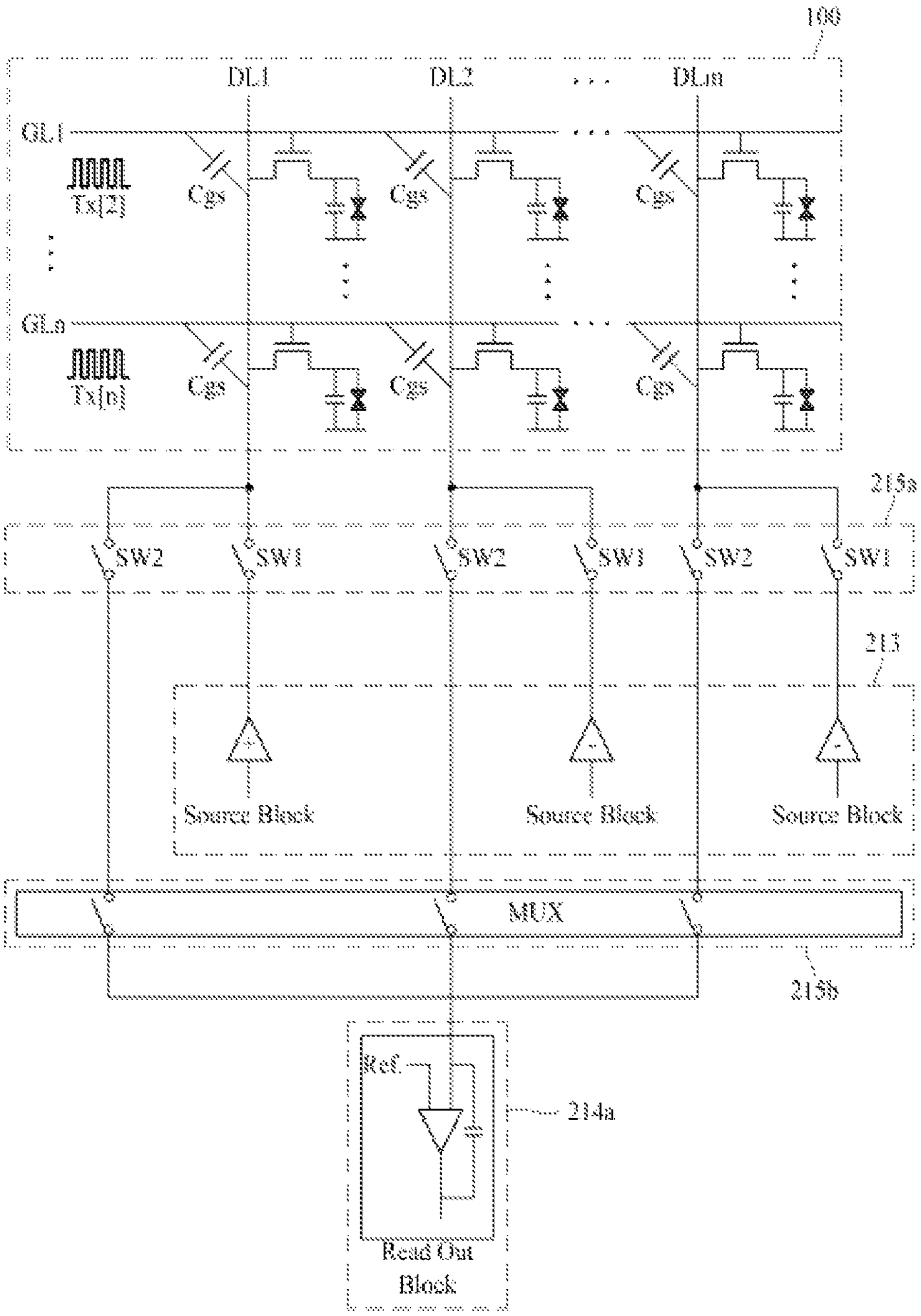
FIG. 8 is a diagram illustrating a connection relationship between a display panel, a data driver, a panel test unit, and a switching unit according to another embodiment of the present disclosure.

FIG. 8 is a diagram illustrating a connection relationship between a display panel, a data driver, a panel test unit, and a switching unit according to another embodiment of the present disclosure.

According to an embodiment of the present disclosure, as illustrated in FIG. 8, the sensing unit 214*a* of the panel test unit 214 may include one readout circuit which is connected to the plurality of data lines DL1 to DLm through the switching unit 215.

The switching unit 215 may selectively connect the data lines DL1 to DLm to the panel test unit 214 or the data driver 213 on the basis of a mode.

According to another embodiment of the present disclosure, the switching unit 215 may include a first switching unit 215*a* and a second switching unit 215*b*.

The first switching unit 215*a* may selectively connect each of the data lines DL1 to DLm to the sensing unit 214*a* of the panel test unit 214 or each of the data lines DL1 to DLm of the display panel 100 to the data driver 213. To this end, the first switching unit 215*a* may include a plurality of first switches SW1 and a plurality of second switches SW2.

According to another embodiment of the present disclosure, the second switching unit 215*b* may selectively connect the first switching unit 215*a* to the sensing unit 214*a* of the panel test unit 214. In detail, the second switching unit 215*b* may selectively connect the panel test unit 214 to each data line connected through the first switching unit 215*a* on the basis of the gate pulses Tx[1] to Tx[n] supplied based on each data line. For example, the second switching unit 215*b* may include a multiplexer MUX. Accordingly, a total area of the sensing unit 214*a* may decrease by reducing the number of readout circuits configuring the sensing unit 214*a*.

Hereinafter, a driving method of a display apparatus according to another embodiment of the present disclosure will be described in detail with reference to FIGS. 9 to 11.

Figure 9:
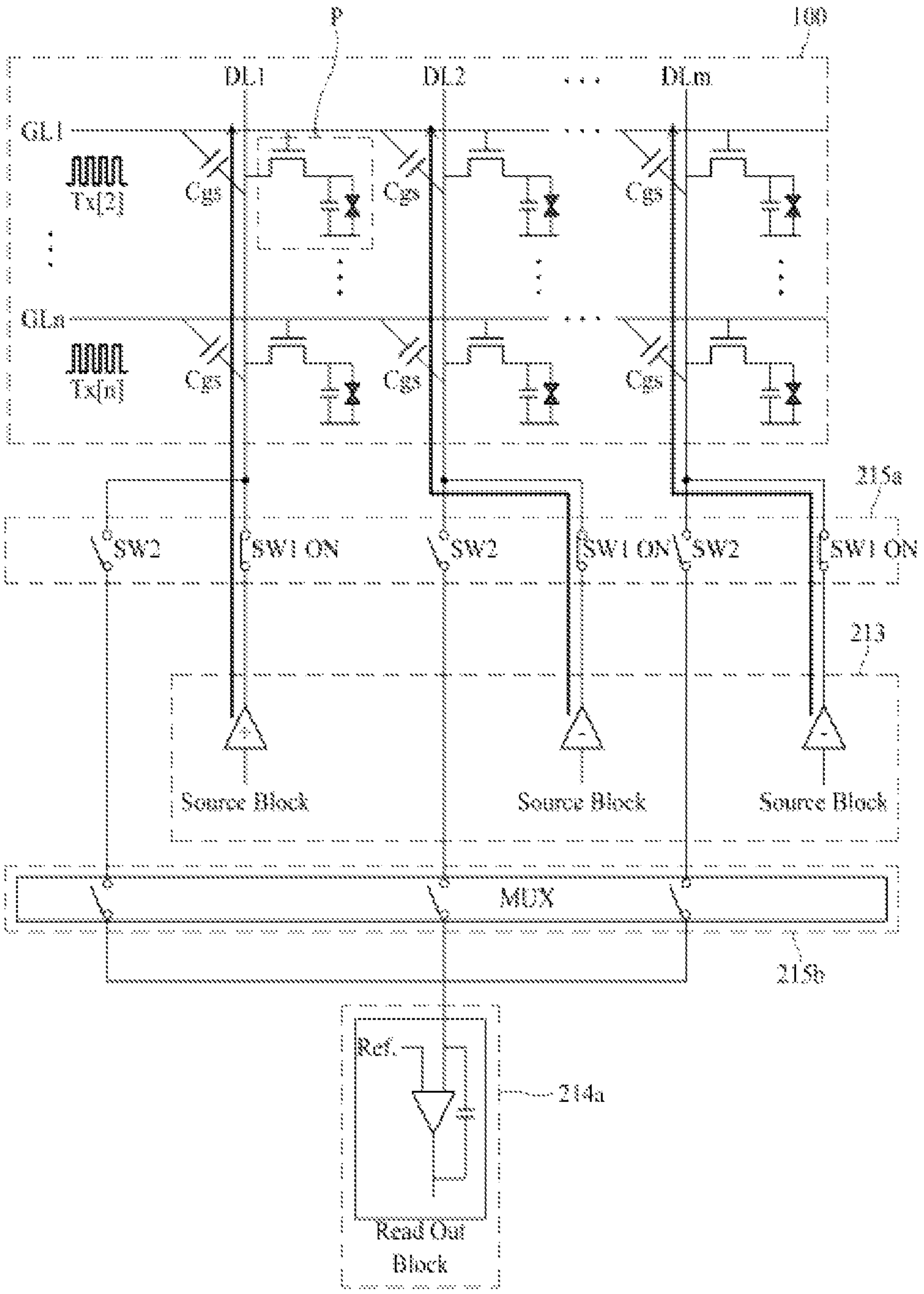
FIG. 9 is a diagram illustrating a display driving method in a display mode according to another embodiment of the present disclosure.

FIG. 9 is a diagram illustrating a display driving method in a display mode according to another embodiment of the present disclosure. FIG. 10 is a flowchart of a panel test method in a panel test mode according to another embodiment of the present disclosure, and FIG. 11 is a diagram illustrating a display driving method in a panel test mode according to another embodiment of the present disclosure.

Referring to FIG. 9, in the display mode, the switching unit 215 may connect a plurality of data lines DL1 to DLm of the display panel to the data driver 213. In detail, in the display mode, a plurality of first switches SW1 of a first switching unit 215*a* may be turned on and may connect the plurality of data lines DL1 to DLm to the data driver 213. Therefore, the data driver 213 may supply a data signal, obtained through analog conversion of an image signal, to pixels P connected to the plurality of data lines DL1 to DLm through the plurality of data lines DL1 to DLm. That is, based on control by the timing controller 211, the gate pulses Tx[1] to Tx[n] synchronized with the data signal may be sequentially supplied to the gate lines GL1 to GLn, and the data signal may be sequentially supplied to the data lines DL1 to DLm, whereby the display panel 100 may display an image.

Figure 10:
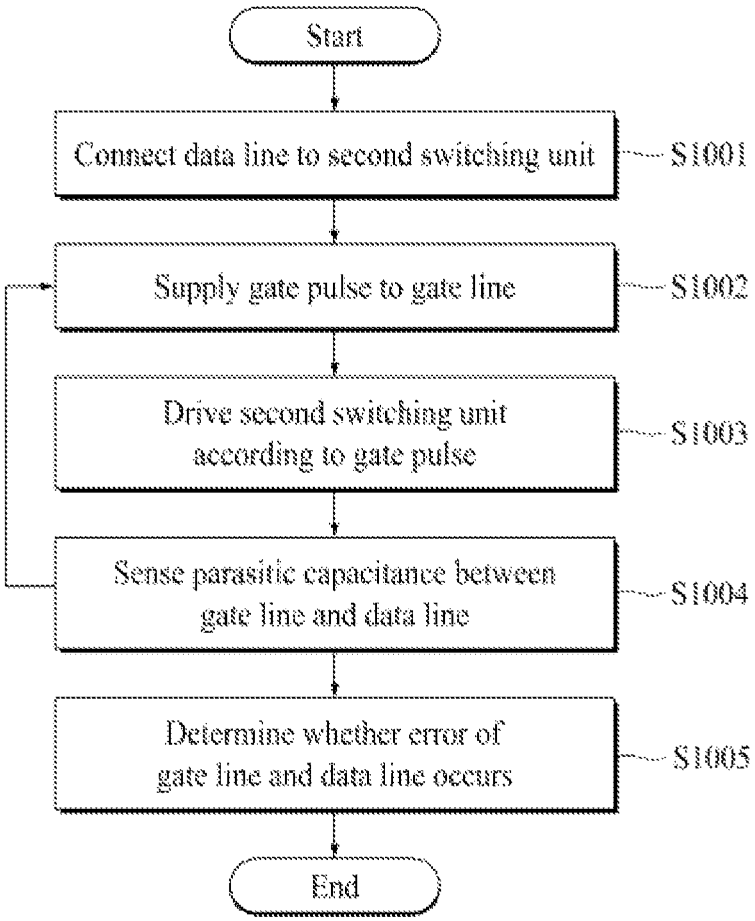
FIG. 10 is a flowchart of a panel test method in a panel test mode according to another embodiment of the present disclosure.
Figure 11:
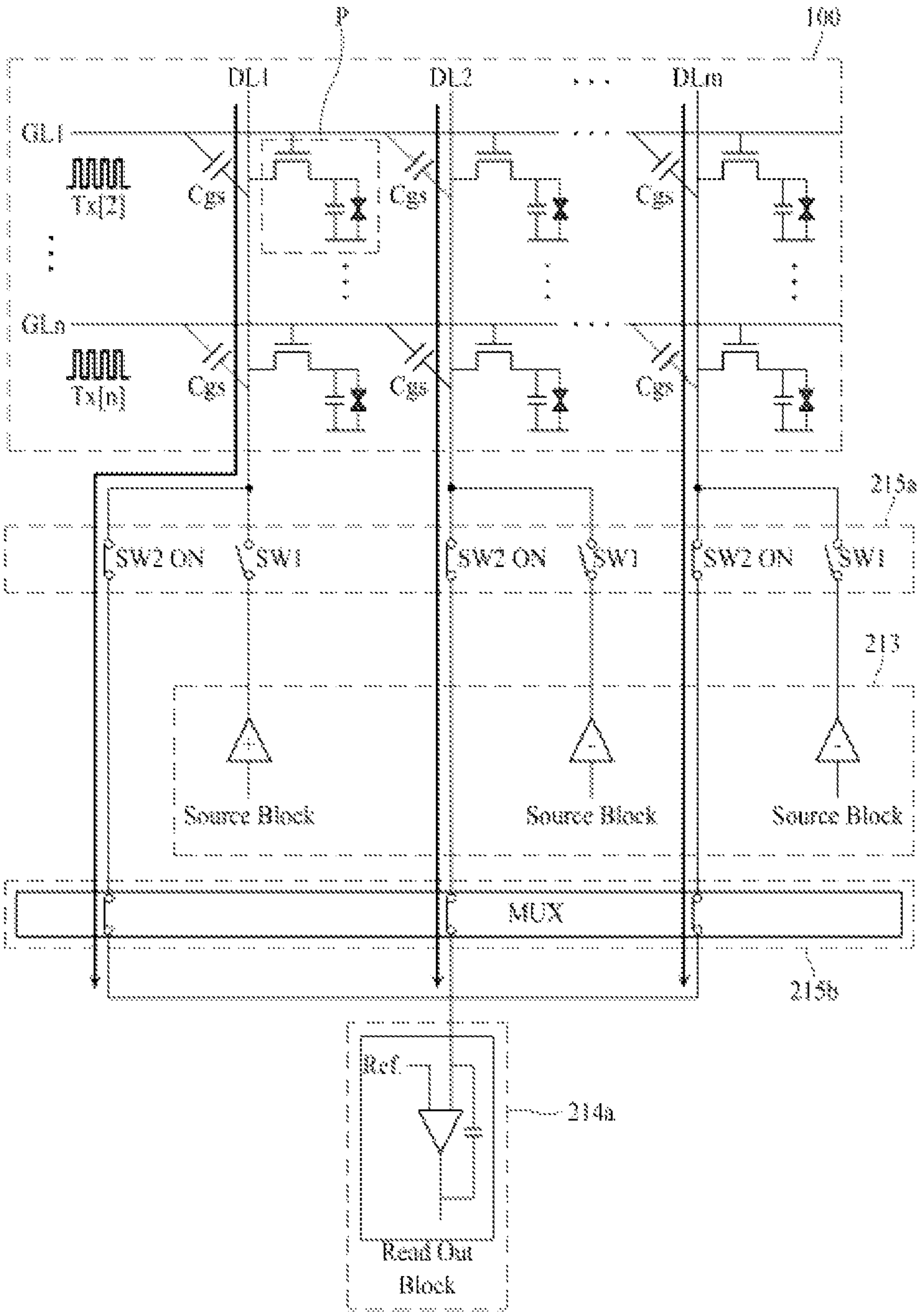
FIG. 11 is a diagram illustrating a display driving method in a panel test mode according to another embodiment of the present disclosure.

Referring to FIG. 10, in the panel test mode, each of the data lines DL1 to DLm may be connected to the second switching unit 215*b* (S1001). In detail, as illustrated in FIG. 11, in the panel test mode, the second switch SW2 of the first switching unit 215*a* may be turned on and may connect the plurality of data lines DL1 to DLm to the second switching unit 215*b*.

Subsequently, the gate pulses Tx[1] to Tx[n] may be supplied to a gate line (S1002). In detail, the gate pulses Tx[1] to Tx[n] may be sequentially supplied to the plurality of gate lines GL1 to GLn, and each of the gate pulses Tx[1] to Tx[n] may be supplied to a corresponding gate line on the basis of the plurality of data lines DL1 to DLm. Therefore, a parasitic capacitance Cgs may be generated between each gate line and each data line.

Subsequently, the second switching unit 215*b* may be driven based on the gate pulses Tx[1] to Tx[n] supplied based on each data line (S1003). In detail, as illustrated in FIG. 11, the gate pulses Tx[1] to Tx[n] respectively based on the data lines DL1 to DLm may be supplied to each gate line, and the second switching unit 215*b* may be configured to connect the sensing unit 214*a* to the first switching unit 215*a* connected to a corresponding data line on the basis of the supplied gate pulses Tx[1] to Tx[n]. For example, when the gate pulse Tx[1] to Tx[n] corresponding to a first data line DL1 is supplied to a first gate line GL1, the second switching unit 215*b* may be configured to connect the sensing unit 214*a* of the panel test unit 214 to the second switch SW2 connected to the first data line DL1.

Subsequently, the panel test unit 214 may sense a parasitic capacitance signal based on the parasitic capacitance Cgs generated between each gate line and each data line (S1004). That is, as described above, the sensing unit 214*a* of the panel test unit 214 may sense the parasitic capacitance Cgs generated between each gate line and each data line. At this time, each sensing value may be stored in the panel test unit 214.

In this case, steps (S1002) and (S1004) may be repeatedly performed until all gate lines are driven. However, the present disclosure is not limited thereto, and steps (S1002) to (S1005) may be repeatedly performed until all gate lines are driven.

Subsequently, the panel test unit 214 may determine the occurrence or not of an error of each gate line or each data line (S1005). In detail, the determination unit 214*b* of the panel test unit 214 may compare a signal of the sensed parasitic capacitance Cgs with the predetermined first threshold value or the predetermined second threshold value to determine the occurrence or not of an error of the gate lines GL1 to GLn or the data lines DL1 to DLm. For example, when a parasitic capacitance signal corresponding to a certain data line is less than the first threshold value, the determination unit 214*b* may determine that a corresponding data line is opened, and when a parasitic capacitance signal corresponding to a certain data line is greater than the second threshold value, the determination unit 214*b* may determine that a corresponding data line or a corresponding gate line is short-circuited. In this case, the first threshold value may be less than the second threshold value. In this case, the occurrence or not of an error of each gate line and each data line may be determined whenever each gate line is driven, a signal based on a parasitic capacitance corresponding to each gate line and each data line may be stored, and after driving of all gate lines is completed, the occurrence or not of an error of each gate line and each data line may be determined. Driving of each gate line and each data line and the occurrence or not of an error of a corresponding gate line or a corresponding data line may be determined by various methods. Also, the occurrence or not of an error of the gate lines GL1 to GLn and the data lines DL1 to DLm may be finally determined based on that the occurrence or not of an error is determined in driving each gate line.

According to an embodiment of the present disclosure, the data lines DL1 to DLm of the display panel 100 may be selectively connected to the data driver 213 or the panel test unit 214 on the basis of a mode, and in the panel test mode, a gate line or a data line where an error occurs may be detected by testing the occurrence or not of an error of the display panel 100 and relevant information may be provided to a user of the display apparatus 1000.

According to the embodiments of the present disclosure, a state of a gate line or a data line of a display panel may be tested without adding a separate circuit to the display panel, and thus, the cost for testing an error of the display panel may decrease. Also, by testing all gate lines and data lines, a gate line or a data line where a problem occurs may be detected, and corresponding information may be provided to a user, thereby efficiently detecting an error of the display panel.

According to the embodiments of the present disclosure, the data line of the display panel may be selectively connected to a data driver or a panel test unit on the basis of a mode, and in a panel test mode, the occurrence or not of an error of the display panel may be tested, and thus, a gate line or a data line where an error occurs may be detected and relevant information may be provided to a user of a display apparatus, thereby efficiently detecting an error of the display panel.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display driving device for driving a display panel including a gate line, a data line intersecting with the gate line, and a pixel defined by the gate line and the data line, the display driving device comprising:

a data driver configured to input an image signal to the pixel through the data line;

a panel test unit configured to determine an occurrence of an error at the gate line or the data line; and a switching unit configured to selectively connect the data driver or the panel test unit to the display panel, wherein when a parasitic capacitance signal generated by the gate line and the data line is less than a first threshold value, the panel test unit is configured to determine that a corresponding gate line or a corresponding data line is opened, and when the parasitic capacitance signal generated by the gate line and the data line is greater than a second threshold value, the panel test unit is configured to determine that a corresponding gate line or a corresponding data line is short-circuited.

2. The display driving device of claim 1, wherein the first threshold value is less than the second threshold value.

3. The display driving device of claim 1, wherein the panel test unit comprises at least one readout circuit connected to the data line through the switching unit.

4. The display driving device of claim 1, wherein the switching unit comprises:

at least one first switch connecting the data line to the data driver; and at least one second switch connecting the data line to the panel test unit.

5. The display driving device of claim 4, wherein, in a display mode, the first switch is configured to be turned on and connect the data line to the data driver, and in a panel test mode, the second switch is configured to be turned on and connect the data line to the panel test unit.

6. The display driving device of claim 1, further comprising a gate driver configured to supply a gate pulse to the gate line, wherein, in a display mode, the gate driver is configured to supply the gate pulse to the gate line and the data driver is configured to supply a data signal to the data line, and in a panel test mode, the gate driver is configured to supply the gate pulse to the gate line, and the panel test unit is configured to be connected to the data line and is configured to receive a parasitic capacitance signal generated between the gate line and the data line to test the occurrence of the error at the gate line and the data line.

7. The display driving device of claim 1, further comprising:

a first switching unit configured to selectively connect the data line to the data driver or the panel test unit; and a second switching unit configured to connect the panel test unit to one of data lines connected through the first switching unit.

8. The display driving device of claim 7, wherein the first switching unit comprises:

at least one first switch configured to connect the data line to the data driver; and at least one second switch configured to connect the data line to the panel test unit, in a display mode, the first switch is configured to be turned on and connect the data line to the data driver, in a panel test mode, the second switch is configured to be turned on and connect the data line to the panel test unit, and in the panel test mode, the second switching unit is configured to connect the panel test unit to one of data lines connected through the first switching unit on the basis of a gate pulse supplied to the gate line.

9. A display driving method comprising:

displaying an image on a display panel including a gate line and a data line in a display mode by using a data driver connected to the display panel; and testing an occurrence of an error of the display panel in a panel test mode by using a panel test unit connected to the display panel, wherein the testing of the occurrence or not of the error of the display panel comprises:

when a parasitic capacitance signal generated by a gate line and a data line of the display panel is less than a first threshold value, determining that the gate line or the data line of the display panel is opened; and when the parasitic capacitance signal is greater than a second threshold value, determining that the gate line or the data line of the display panel is short-circuited.

10. The display driving method of claim 9, wherein the first threshold value is less than the second threshold value.

11. The display driving method of claim 9, wherein the testing of the occurrence of the error of the display panel comprises sensing the parasitic capacitance signal generated in the display panel by using at least one readout circuit.

12. The display driving method of claim 9, wherein the displaying of the image comprises turning on at least one first switch connecting the data driver to the display panel, and the testing of the occurrence of the error of the display panel comprises turning on at least one second switch connecting the panel test unit to the display panel.

13. The display driving method of claim 9, wherein the displaying of the image comprises sequentially outputting each of a gate pulse and a data signal to the display panel, and the testing of the occurrence of the error of the display panel comprises sequentially inputting the gate pulse to the display panel.

14. The display driving method of claim 9, wherein the displaying of the image comprises turning on at least one first switch of a first switching unit connecting the data driver to the display panel, and the testing of the occurrence of the error of the display panel comprises:

turning on at least one second switch of the first switching unit to connect the panel test unit to the display panel;

sequentially inputting a gate pulse to the display panel;

inputting the parasitic capacitance signal, generated in the display panel, to at least one readout circuit of a sensing unit; and determining the occurrence of the error of the display panel by using the parasitic capacitance signal.

15. The display driving method of claim 9, wherein the displaying of the image comprises turning on at least one first switch of a first switching unit connecting the data driver to the display panel, and the testing of the occurrence of the error of the display panel comprises:

turning on at least one second switch of the first switching unit to connect a second switching unit to the display panel;

sequentially inputting a gate pulse to the display panel;

driving the second switching unit on the basis of the gate pulse to connect the data driver to the display panel;

inputting the parasitic capacitance signal, generated in the display panel, to at least one readout circuit of a sensing unit; and determining the occurrence of the error of the display panel by using the parasitic capacitance signal.

* * * * *